2,837,186
BRAKE ANTI-CREEP MECHANISM

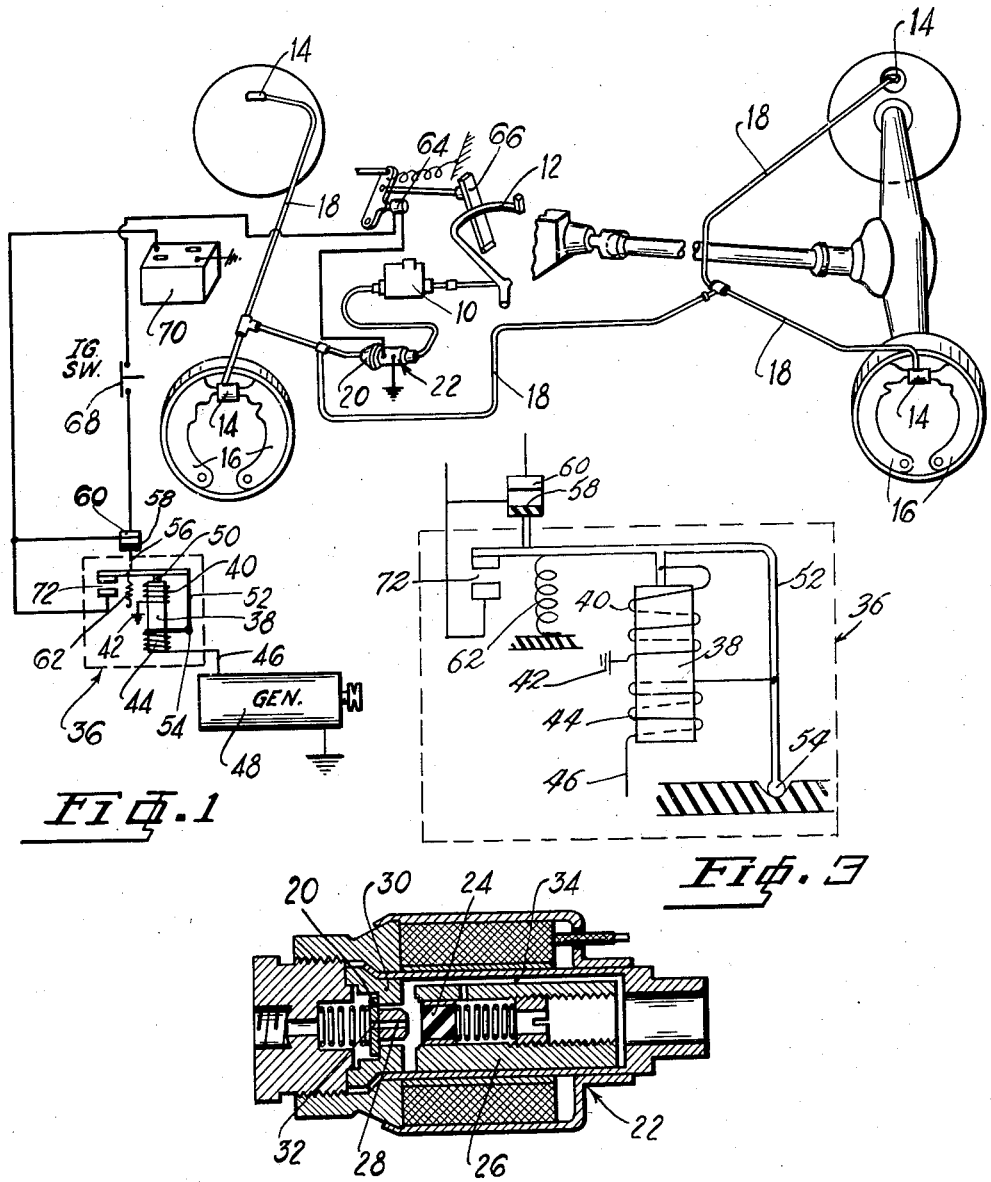
June 3, 1958     E. R. PRICE     2,837,186
BRAKE ANTI-CREEP MECHANISM
Filed Nov. 17, 1954
INVENTOR.
EARL R. PRICE
BY H. O. Clayton
ATTORNEY United States Patent Office 2,837,186
Patented June 3, 1958

Earl R. Price, South Bend, Ind., assignor to Bendix Aviation Corporation, South Bend, Ind., a corporation of Delaware Application November 17, 1954, Serial No. 469,426

6 Claims. (Cl. 192—3)

This invention relates in general to anti-creep mechanism and in particular to anti-creep mechanism for controlling the brakes of an automotive vehicle.

With many anti-creep brake control mechanisms of the prior art the mechanism is operative as a function of the speed of the vehicle; however such a mechanism usually employs an expensive vehicle speed responsive governor operated switch. It is accordingly an object of my invention to provide a relatively simple, inexpensive and easily serviced anti-creep mechanism employing, as the principal element thereof, one of the standard controls of the vehicle said control being operative as a function of the speed of the engine of the vehicle; and in a preferred embodiment of my invention I suggest the use of the generator cut out relay of the electrical mechanism of the vehicle.

A further object of my invention is to provide a vehicle brake anti-creep mechanism operative in accordance with the speed of the engine of the vehicle, said mechanism being operative only when the accelerator of the vehicle is released and a generator cut out relay operated switch is closed.

The above and other objects and features of the invention will appear more fully hereinafter from a consideration of the following description taken in connection with the accompanying drawings where one embodiment of the invention is illustrated by way of example.

Figure 1 is a diagrammatic view disclosing one embodiment of the anti-creep mechanism of my invention;

Figure 2 is a sectional view disclosing details of the solenoid operated check valve of the mechanism of Figure 1; and Figure 3 is an enlarged fragmentary view of a portion of Figure 1.

There is disclosed in the three figures of the drawing a preferred embodiment of my invention wherein my anti-creep mechanism is employed to control a well known type of brake mechanism of an automotive vehicle. This brake mechanism, no claim to which is made, per se includes a master cylinder 10 housing a piston, not shown, which is actuated as a result of the manual operation of a brake pedal 12. Depression of the brake pedal to apply the brakes energizes slave cylinders 14 which in turn actuate the brake shoes 16 of the wheel brakes of the vehicle. In this operation an incompressible or substantially incompressible brake fluid flows through conduits 18 and upon release of the brake pedal a certain mechanism including return springs, not shown, operates to return the parts of the mechanism to their brake off positions.

Describing now the anti-creep mechanism of my invention a solenoid operated check valve 20, Figure 2, operates, with a release of the brake pedal and after the energization of a grounded solenoid 22, to trap the brake fluid between the slave cylinders and said valve, thereby holding the brakes in their applied position; however, said solenoid when deenergized serves to disable this valve and thereby disable the anti-creep mechanism. Describing the latter operation a spring loaded yieldable member 24, housed within the armature 26 of the solenoid, is spaced from an opening 28 in the pole piece 30 of the solenoid thereby making it possible for the brake fluid to return through an opening 32 in the check valve, the opening 28, and thence through a recess 34 in the armature 26 and on toward the master cylinder 10.

In certain cars of the day the solenoid 22 is energized and deenergized, to operate the anti-creep portion of the brake mechanism, with an operation of a vehicle speed responsive governor operated switch; however, this mechanism is expensive and is somewhat uncertain in operation, particularly as to its time of operation. Accordingly, it is an object of my invention to provide an efficient, effective and relatively cheap engine speed controlled means for controlling the time of operation of a switch mechanism; and said control means may, as disclosed in the figures of the drawing, be substituted for the aforementioned vehicle speed responsive governor operated control switch of the anti-creep mechanism of the day.

Now the electrical systems of most automotive vehicles of the day include an engine speed responsive generator cut out relay unit accordingly I propose that this unit, indicated by the reference numeral 36 in Figure 1, be employed as a control means in the anti-creep mechanism of my invention. The unit 36, no claim to which is made per se, includes a switch operating movable armature 38 around which is wound a stationary relatively light winding 40 grounded at 42; and in series therewith a relatively heavy winding 44 which is connected, by a wire 46, to an engine driven generator 48. The armature 38 is connected, by a member such as a pin 50, to a switch actuating angular shaped member 52 of electrically conductive material said member being pivotally mounted at 54. The upper end portion of the member 52 is connected with a member such as a pin 56; and this pin is connected to an insulating member 58 upon which is mounted the movable contact of a normally closed switch 60. This switch may be closed by the operation of spring 62 acting upon the switch operating member 52.

As is disclosed in Figure 1 the switch 60 is electrically connected in series with the aforementioned grounded solenoid 22; a switch 64 which is opened by a depression of the accelerator 66 of the vehicle, said switch being closed by the accelerator return spring, not shown, when the accelerator is released; the ignition switch 68 of the vehicle; and a grounded battery 70. A normally open generator cut out switch 72 of the unit 36 is electrically connected in series with the generator 48, the heavy winding or coil 44 of the cut out relay 36, the switch operating member 52, and the grounded battery 70. The spring 62 serves to bias the switch 60 to its closed position and the switch 72 to its open position.

Describing now in brief an operation of the embodiment of my invention disclosed in the two figures of the drawing the anti-creep mechanism is rendered inoperative so long as the internal combustion engine of the vehicle, not shown, is turning over at or above a certain critical speed say any speed above the idling speed of the engine which may by say 475 R. P. M. That is to say the parts of the mechanism are so constructed, arranged, and adjusted that when the engine is, for example, brought up to a speed of 476 R. P. M., the combined effect of the grounded light wire coil 40 and heavy wire coil 44 will result in a drawing of the armature 38 with its connected switch operating member 52 downwardly, Figure 1, to overcome the spring 62 thereby opening the switch 60 and closing the switch 72; and this operation results both in a charging of the battery 70 and in a rendering of the anti-creep mechanism in operative by the operation of deenergizing the solenoid 22, Figure 2, all as explained above. Explaining this operation it is to be noted, by an examination of Figure 1 of the drawings, that after the armature 38 is drawn downwardly to close the switch 72 the coil 40 has, for the time being, no further function; for the electrical circuit from the generator to the battery is then completed via the coil 44.

As to the operation of the mechanism to initiate an operation of the anti-creep mechanism when the accelerator is released to close the switch 64 and the speed of the engine is dropped to its idling speed of 475 R. P. M. the pulling force exerted by the armature 38 is insufficient to overcome the force exerted by the spring 62; and this automatically results in an operation of said spring to close the switch 60 and open the switch 72. This operation results in the anti-creep mechanism of my invention being again rendered operative to hold the brakes applied once they are applied; and this operation also results in electrically disconnecting the generator and battery—that is a cutting off of the charging of the latter.

There is thus provided, by the mechanism of my invention, an effective and efficient brake anti-creep mechanism utilizing the generator cut out relay of the car as one of its elements; and thereby not only cutting down the cost of said mechanism but also providing an effective anti-creep mechanism responsive to the speed of the engine, not the speed of rear wheels of the vehicle; for the latter are not at all times directly proportioned to the speed of the vehicle.

Although only one embodiment of the invention has been illustrated and described, various changes in the form and relative arrangements of the parts may be made to suit requirements.

I claim:

1. In an automotive vehicle including a generator, a grounded battery, a generator cut out relay, electrical means interconnecting the battery, relay and generator, wheel brakes, and means for operating said brakes including a brake pedal; anti-creep means cooperating with the brake operating means and operative to hold the brakes applied once they are applied by an operation of the brake pedal and despite a release of said pedal, said anti-creep means including an electrically operated valve, and means for controlling the operation of said valve including means actuated by the relay.

2. In an automotive vehicle including a generator, a grounded battery, a generator cut out relay, electrical means interconnecting the battery, relay and generator, wheel brakes, an accelerator, spring means for returning the accelerator to its released position, and means for operating said brakes including a brake pedal; anti-creep means cooperating with the brake operating means and operative to hold the brakes applied once they are applied by an operation of the brake pedal and despite a release of said pedal, said anti-creep means including an electrically operated check valve, and means for controlling the operation of said valve including means actuated by the relay and means actuated by the accelerator return spring means.

3. In an automotive vehicle including a generator, a grounded battery, a generator cut out relay, electrical means interconnecting the battery, relay and generator, wheel brakes, an accelerator, spring means for returning the accelerator to its released position, and hydraulic means for operating said brakes; anti-creep means cooperating with the brake operating means and operative to hold the brakes applied once they are applied by an operation of the brake pedal and despite a release of said pedal, said anti-creep means including an electrically operated check valve, and means for controlling the operation of said valve including a switch actuated by the relay and switch means actuated by the accelerator return spring means.

4. In an automotive vehicle including a generator, a grounded battery, a generator cut out relay, electrical means interconnecting the battery, relay and generator, wheel brakes, an accelerator, spring means for returning the accelerator to its released position, and means for operating said brakes including a brake pedal; anti-creep means cooperating with the brake operating means and operative to hold the brakes applied once they are applied by an operation of the brake pedal and despite a release of said pedal, said anti-creep means including an electrically operated check valve, and means for controlling the operation of said valve including a switch which is closed, to make possible an operation of the anti-creep mechanism, when the relay is inoperative to electrically connect the generator with the battery, and further including switch means actuated by the accelerator return spring means.

5. In an automotive vehicle including an electrically interconnected generator, generator cut out relay and battery combination, and further including wheel brakes and hydraulic means of applying the brakes; anti-creep means operative, in cooperation with the latter means, to at times effect a holding of the brakes in their applied position once they are applied, said anti-creep means including switch means closed by the relay when and only when said relay is inoperative to electrically interconnect the generator and battery.

6. In an automotive vehicle including an accelerator, a spring for returning the accelerator to its released position, an electrically interconnected generator, generator cut out relay and battery combination, and further including wheel brakes and hydraulic means for applying the brakes; anti-creep means operative, in cooperation with the latter means, to at times effect a holding of the brakes in their applied position once they are applied, said anti-creep means including switch means closed by the relay when and only when said relay is inoperative to electrically interconnect the generator and battery and further including a switch which is closed by an operation of the accelerator return spring.

References Cited in the file of this patent

UNITED STATES PATENTS

| | | |
|---|---|---|
| 2,329,156 | Coffey | Sept. 7, 1943 |
| 2,630,196 | Weiss | Mar. 3, 1953 |